United States Patent
Coelingh et al.

(10) Patent No.: US 10,086,844 B2
(45) Date of Patent: Oct. 2, 2018

(54) VEHICLE SENSOR DIAGNOSIS SYSTEM AND METHOD AND A VEHICLE COMPRISING SUCH A SYSTEM

(71) Applicant: VOLVO CAR CORPORATION, Gothenburg (SE)

(72) Inventors: Erik Coelingh, Alvangen (SE); Stefan Solyom, Olofstorp (SE); Mattias Erik Brannstrom, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 205 days.

(21) Appl. No.: 14/644,676

(22) Filed: Mar. 11, 2015

(65) Prior Publication Data

US 2015/0266490 A1    Sep. 24, 2015

(30) Foreign Application Priority Data

Mar. 18, 2014    (EP) .................................... 14160563

(51) Int. Cl.
  *G07C 5/08*    (2006.01)
  *G01S 7/40*    (2006.01)
  (Continued)

(52) U.S. Cl.
  CPC ......... *B60W 50/082* (2013.01); *G07C 5/0808* (2013.01); *B60W 30/12* (2013.01); *B60W 30/16* (2013.01); *B60W 2550/12* (2013.01)

(58) Field of Classification Search
  CPC .. B60W 2550/12; B60W 30/12; B60W 30/16; B60W 50/082
  See application file for complete search history.

(56) References Cited

U.S. PATENT DOCUMENTS 5,901,806 A    5/1999   Takahashi
2006/0095195 A1*   5/2006   Nishimura .......... B60W 30/025
                                                             701/96

(Continued)

FOREIGN PATENT DOCUMENTS

CN    101334283 A    12/2008
CN    101482450 A    7/2009
(Continued)

OTHER PUBLICATIONS

Kummerle R, Autonomous Driving in a Multi-level Parking Structure (2009).*

(Continued)

*Primary Examiner* — Charles J Han
(74) *Attorney, Agent, or Firm* — Brooks Kushman P.C.

(57) ABSTRACT

A vehicle sensor diagnosis system and method, and a vehicle including such a system are provided. The vehicle sensor diagnosis system is configured to predict upcoming vehicle surrounding conditions along at least a section of a host vehicle route based on database information on the host vehicle surroundings along the section and information on a current host vehicle surrounding, estimate an expected level of sensor performance for the route section based on the prediction, assess the level of sensor performance detected during host vehicle travel along the host vehicle route section, assess if a difference between the estimated level of sensor performance and the detected level of sensor performance for the host vehicle route section exceeds a first threshold difference and, if so, initiate a diagnose result communication.

17 Claims, 3 Drawing Sheets

(51) Int. Cl.
    *G01P 21/00*     (2006.01)
    *B60W 50/08*     (2012.01)
    *B60W 30/12*     (2006.01)
    *B60W 30/16*     (2012.01)

(56) References Cited

U.S. PATENT DOCUMENTS

2012/0200708 A1     8/2012   Fukuda
2013/0253767 A1*   9/2013   Lee ..................... B60W 50/04
                                                                            701/42

FOREIGN PATENT DOCUMENTS

| CN | 103339009 A | 10/2013 |
| --- | --- | --- |
| CN | 103359114 A | 10/2013 |
| DE | 102011002911 A1 | 7/2012 |
| EP | 2604478 | 6/2013 |

OTHER PUBLICATIONS

Extended European Search Report for EP 141605614, Completed by the European Patent Office, dated Sep. 4, 2014, 10 Pages.
The State Intellectual Property Office of People's Republic of China, First Seach Report for Application No. 201510106405.8, dated May 15, 2018, 1 page.
The State Intellectual Property Office of People's Republic of China, First Office Action for Application No. 201510106405.8, dated May 28, 2018, 8 pages (including English language translation).

\* cited by examiner

VEHICLE SENSOR DIAGNOSIS SYSTEM AND METHOD AND A VEHICLE COMPRISING SUCH A SYSTEM

CROSS-REFERENCE TO RELATED APPLICATIONS

This application claims foreign priority benefits under 35 U.S.C. § 119(a)-(d) to European Patent Application No. EP 14160563.4, filed Mar. 18, 2014, which is incorporated by reference in its entirety.

TECHNICAL FIELD

Embodiments herein relate to a vehicle sensor diagnosis system. Embodiments herein further relate to a vehicle comprising a vehicle sensor diagnosis system and to a method for diagnosing vehicle sensors.

BACKGROUND

Some vehicles today are equipped with various driver support systems, such as predictive safety systems and adaptive cruise control systems. The aims with such systems are often to increase safety and/or to increase comfort for the driver. Some of the systems may assist the driver with tasks that he/she otherwise performs manually, such as keeping the vehicle in a particular road lane or to keep a distance to a vehicle ahead.

In order to provide these semi-automatic or automatic functions, the vehicle systems often monitor a vehicle surrounding using a number of vehicle sensors. The sensors may provide the systems with information on surrounding vehicles, obstacles and road markings. Thus, the vehicle systems depend on reliable sensor information in order to function properly.

However, if the performance of a sensor decreases, a driver may have to operate the vehicle manually with short notice. If sensor performance of sensors in vehicles with automatic- or semi-automatic drive functions decreases, some of the automatic- or semi-automatic drive functions may be disabled. If sensor performance of sensors in an autonomous vehicle decreases, the vehicle may be configured to stop. Short preparation times for manual driving, disabled vehicle functions and/or unplanned stops may be annoying for the driver.

Improvements related to safety and/or comfort during driving are therefore desirable.

SUMMARY

Embodiments herein aim to provide a vehicle sensor diagnosis system eliminating or at least reducing the problems and/or drawbacks associated with prior art solutions.

According to an embodiment, this is provided by a vehicle sensor diagnosis system comprising one or more sensors arranged to monitor a host vehicle surrounding during drive along a host vehicle route and one or more processing units connected to a database, the vehicle sensor diagnosis system being connected to a host vehicle positioning arrangement, arranged to determine a host vehicle position and driving direction, wherein the vehicle sensor diagnosis system is arranged to;

predict, by the processing unit, upcoming vehicle surrounding conditions along at least a section of the host vehicle route based on from the database retrieved information on the host vehicle surroundings along said section and information on a current host vehicle surrounding, estimate, by the processing unit, an expected level of sensor performance for said route section based on the prediction, assess, by the processing unit, the level of sensor performance detected during host vehicle travel along said host vehicle route section, assess, by the processing unit, if a difference between the estimated level of sensor performance and the detected level of sensor performance for said host vehicle route section exceeds a first threshold difference and if so, initiate, by the processing unit, a diagnose result communication.

Since the vehicle sensor diagnosis system is arranged to predict upcoming vehicle surrounding conditions, estimate an expected level of sensor performance based on the prediction, assess a detected level of sensor performance, assess if a difference between the estimated level of sensor performance and the detected level of sensor performance exceeds a first threshold difference and if so, initiate a diagnose result communication, both safety and comfort are increased.

The vehicle sensor diagnosis system is arranged to, continuously or at certain intervals, predict upcoming vehicle surrounding conditions for at least a section of the route along which the host vehicle travels and to estimate which level of sensor performance that can be expected when the host vehicle drives along the section of the route.

The vehicle surrounding conditions may relate to various conditions that prevail ahead of the host vehicle along the host vehicle route. Information on the host vehicle surrounding conditions may relate to road geometry such as road direction, curves, crests, sloping, inclinations, width, length etc. The information may further relate to objects near or on the road ahead. Such information may indicate e.g. positions of road signs and various reference objects, obstacles, trees and buildings. The vehicle surrounding conditions may also relate to information displayed on road signs and other sources of traffic information.

The vehicle surrounding conditions may relate to light conditions prevailing along route sections at different times of the day and at different seasons. Various climate information, e.g. relating to temperature, humidity, fog, ice, ice crystals, snow and slippery areas, may be stored in the database.

The vehicle sensor diagnosis system is also aware of any host vehicle surrounding conditions prevailing at the current position of the host vehicle. Some of the information may be received from the database, and some information may be detected via the vehicle sensors. Hence, information on a current host vehicle surrounding may also relate to light conditions, climate conditions, road geometry etc.

The vehicle sensor diagnosis system is arranged to use the information on vehicle surrounding conditions, along at least a section of the host vehicle route ahead together with information on a current host vehicle surrounding, to estimate an expected level of sensor performance for said route section based on the prediction.

For example; the vehicle sensor diagnosis system has retrieved information that the upcoming road comprises a straight section without any curves and crests and that a speed sign indicative of the information 90 km/h is located 2 meters to the right of the road 350 meters ahead.

The vehicle sensor diagnosis system is further aware of current vehicle surrounding conditions indicative of daylight and good visibility. Given these conditions, the vehicle sensor diagnosis system estimates that a camera sensor should be able to detect the upcoming speed sign approximately 50 meters away from the speed sign. The vehicle sensor diagnosis system may use information on which sensor performance level that can be expected when the sensor is new and not degraded at all.

When the host vehicle drives along the abovementioned section of the host vehicle route when the host vehicle is new, the camera sensor may detect the speed sign at 50 meters.

When the host vehicle drives along the abovementioned section of the host vehicle route when the host vehicle is two years old, the camera sensor may detect the speed sign at 45 meters. The degradation of the sensor performance level may be caused by dirt accumulated on a sensor lens, small cracks in a windshield between the sensor and the vehicle surrounding etc.

When the host vehicle is five years old, the camera sensor may detect the speed sign when the host vehicle is 40 meters away from the speed sign. After five years, the difference between the estimated level of sensor performance (i.e. detection from 50 meters) and the detected level of sensor performance (i.e. detection from 40 meters) is 10 meters.

This difference of 10 meters is then compared with a threshold difference. In this example, the threshold difference may be selected to be 15 meters. The sensors are then assessed to have a somewhat degraded sensor performance, but are still considered to have a sufficient accuracy.

When the host vehicle is six years old, the camera sensor may detect the speed sign when the host vehicle is 30 meters away from the speed sign. The difference between the estimated level of sensor performance (i.e. detection from 50 meters) and the detected level of sensor performance (i.e. detection from 30 meters) is 20 meters, which exceeds the threshold difference of 15 meters.

The vehicle sensor diagnosis is then arranged to initiate a diagnose result communication. This diagnose result communication may be displayed into a host vehicle interior or may be uploaded to a database or vehicle workshop. The communication may indicate that the camera sensor performance is degraded. The sensor may then need to be cleaned or replaced, or the windshield (below which the camera sensor is mounted) may have to be cleaned or replaced.

According to some embodiments, the vehicle sensor diagnosis system is arranged to first assess the detected sensor performance and then compare with the expected sensor performance for a driven host vehicle route section.

According to some embodiments, the vehicle sensor diagnosis system is arranged to communicate the diagnose result into a vehicle interior.

Since the vehicle sensor diagnosis system is arranged to communicate the diagnose result into a vehicle interior, the diagnose result may be communicated to a vehicle occupant. The vehicle sensor diagnosis system may comprise or be connected to a user interface, for example comprising one or more displays and/or audio units. Hence, the diagnose result may be communicated via an audio-alert or as a visual alert on the one or more displays.

According to some embodiments, the vehicle sensor diagnosis system is arranged to communicate and store the diagnose result to the database.

Since the vehicle sensor diagnosis system is arranged to communicate and store the diagnose result to the database, information on the sensor performance level may be accessed by e.g. a vehicle workshop, a vehicle manufacturer and/or a sensor manufacturer. Thus, the next time the vehicle is sent for a service, the workshop is aware of the sensor performance status and may clean or repair the sensor/sensors.

The diagnose result may be uploaded in real time to the cloud. According to some embodiments, a user or other person may access the diagnose result via a mobile device, such as via a program/application in a smartphone, tablet and/or computer.

According to some embodiments, the vehicle sensor diagnosis system further is arranged to retrieve from the database information on sensor performance levels for sensors in other vehicles.

Since the vehicle sensor diagnosis system is arranged to retrieve information from the database on sensor performance levels for sensors in other vehicles, any vehicle sensor diagnosis system in any host vehicle may have access to a large amount of comparable sensor data, and information on sensor performances in other vehicles.

According to some embodiments, the vehicle sensor diagnosis system is arranged to estimate the expected level of sensor performance for at least an upcoming section of said host vehicle route also based on the information on sensor performance levels for sensors in other vehicles.

Since the vehicle sensor diagnosis system is arranged to estimate the expected level of sensor performance for at least an upcoming section of said host vehicle route also based on the information on sensor performance levels for sensors in other vehicles, the estimation may be very accurate.

For example: If it is assessed that the detected sensor performance for a defined host vehicle road section is below the expected sensor performance in the host vehicle, the vehicle sensor diagnosis system can use information collected by other vehicle sensor diagnosis systems in other vehicles in order to assess if the difference is causes by a sensor degradation of a sensor in the host vehicle. If several different sensor diagnosis systems in several different vehicles have differences between expected and detected sensor performance levels, this may indicate that the difference is not an effect of a degraded senor. If several different sensor diagnosis systems in several different vehicles have problems to detect the same speed sign or similar, the cause may be e.g. snow on the speed sign, which render detection more difficult. If the host vehicle sensor diagnosis system have problems to detect a speed sign that sensors in other vehicles easily detects, it may be likely that the sensor in the host vehicle is degraded.

According to some embodiments, the vehicle sensor diagnosis system is arranged in an autonomous vehicle.

Since the vehicle sensor diagnosis system is arranged in an autonomous vehicle, it may be ensured that sensors used for autonomous driving not are degraded below an acceptable level.

According to some embodiments, the sensor diagnosis system is arranged to disable autonomous drive functions if the difference between the estimated level of sensor performance and the detected level of sensor performance for said host vehicle route section exceeds the first threshold difference.

Since the sensor diagnosis system is arranged to disable autonomous drive functions if the difference between the estimated level of sensor performance and the detected level of sensor performance for said host vehicle route section exceeds the first threshold difference, it is ensured that the performance of the sensors necessary for autonomous driving is on an acceptable level. If the performance level is insufficient for autonomous driving, at least some autonomous drive functions are disabled such that the functions can be performed manually instead. Due to this, safety and comfort are enhanced.

According to some embodiments, the vehicle sensor diagnosis system is arranged to estimate an expected level of sensor performance for at least an upcoming section of said host vehicle route based on from the database retrieved information on at least one of; road sign information, road geometry information, light condition information, weather information and information on received data signal strength for the positioning arrangement.

Since, the vehicle sensor diagnosis system is arranged to estimate an expected level of sensor performance for at least an upcoming section of said host vehicle route based on from the database retrieved information on at least one of; road sign information, road geometry information, light condition information, weather information and information on received data signal strength for the positioning arrangement both safety and comfort are increased.

According to some embodiments, the vehicle sensor diagnosis system is arranged to repeatedly assess and store information on the difference between the estimated level of sensor performance and the detected level of sensor performance over an extensive time period, and to initiate a diagnose result communication if the difference exceeds a second threshold difference.

Since the vehicle sensor diagnosis system is arranged to repeatedly assess and store information on the difference between the estimated level of sensor performance and the detected level of sensor performance over an extensive time period, and to initiate a diagnose result communication if the difference exceeds a second threshold difference both safety and comfort are increased. The extensive period of time may be months, years or a sensor lifetime.

If the second threshold difference is selected to be smaller than the first threshold difference the vehicle sensor diagnosis initiates the diagnose result communication before the first threshold difference is reached.

In the example above, the estimated level of sensor performance was 50 meters from the speed sign, the detected level of sensor performance was 30 meters and the first threshold difference was 15 meters. Since the difference between the estimated and detected sensor performance exceeds the threshold difference, the host vehicle sensor diagnose system initiates a diagnose result communication.

With a second threshold difference which is smaller than the first threshold difference, such as 12-14 meters in the above example, the vehicle sensor diagnosis system may initiate a diagnose result communication when the sensor diagnosis system assess that the detected sensor performance is about to exceed the first threshold difference. Hence, the sensor may be repaired or replaced before the first threshold difference is reached.

Embodiments herein also aim to provide a vehicle comprising a vehicle sensor diagnosis system without the problems or drawbacks described above.

According to some embodiments, this is provided by a vehicle comprising a vehicle sensor diagnosis system according to embodiments disclosed herein.

Thus, hereby is provided a vehicle, eliminating or at least reducing the problems and/or drawbacks associated with prior art vehicles.

Embodiments herein also aim to provide a method for diagnosing vehicle sensors without the problems or drawbacks described above.

According to some embodiments, this is provided by a method for diagnosing vehicle sensors with a vehicle sensor diagnosis system comprising one or more sensors arranged to monitor a host vehicle surrounding during drive along a host vehicle route and one or more processing units connected to a database, the vehicle sensor diagnosis system being connected to a host vehicle positioning arrangement, arranged to determine a host vehicle position and driving direction, wherein the method comprises;

predicting, by the processing unit, upcoming vehicle surrounding conditions along at least a section of the host vehicle route based on from the database retrieved information on the host vehicle surroundings along said section and information on a current host vehicle surrounding, estimating, by the processing unit, an expected level of sensor performance for said route section based on the prediction, assessing, by the processing unit, the level of sensor performance detected during host vehicle travel along said host vehicle route section, assessing, by the processing unit, if a difference between the estimated level of sensor performance and the detected level of sensor performance for said host vehicle route section exceeds a first threshold difference and if so, initiating, by the processing unit, a diagnose result communication.

Since the method comprises: predicting upcoming vehicle surrounding conditions, estimating an expected level of sensor performance based on the prediction, assessing a detected the level of sensor performance, assessing if a difference between the estimated level of sensor performance and the detected level of sensor performance exceeds a first threshold difference and if so, initiating a diagnose result communication both safety and comfort are increased.

Further features of, and advantages with, the embodiments herein will become apparent when studying the appended claims and the following detailed description. Those skilled in the art will realize that different features of the embodiments herein may be combined to create embodiments other than those described in the following, without departing from the scope of the appended claims.

BRIEF DESCRIPTION OF THE DRAWINGS

Various aspects of embodiments herein, including their particular features and advantages, will be readily understood from the following detailed description and the accompanying drawings, in which.

DETAILED DESCRIPTION

As required, detailed embodiments are disclosed herein. However, it is to be understood that the disclosed embodiments are merely exemplary and embodiments may take various and alternative forms. The figures are not necessarily to scale. Some features may be exaggerated or minimized to show details of particular components. Therefore, specific structural and functional details disclosed herein are not to be interpreted as limiting, but merely as a representative basis for teaching one skilled in the art to variously employ the present disclosure.

Embodiments herein will now be described more fully with reference to the accompanying drawings, in which example embodiments are shown. As noted, this application should not be construed as limited to the embodiments set forth herein. Disclosed features of example embodiments may be combined as readily understood by one of ordinary skill in the art to which this application belongs. Like numbers refer to like elements throughout.

Well-known functions or constructions will not necessarily be described in detail for brevity and/or clarity.

Figure 1:
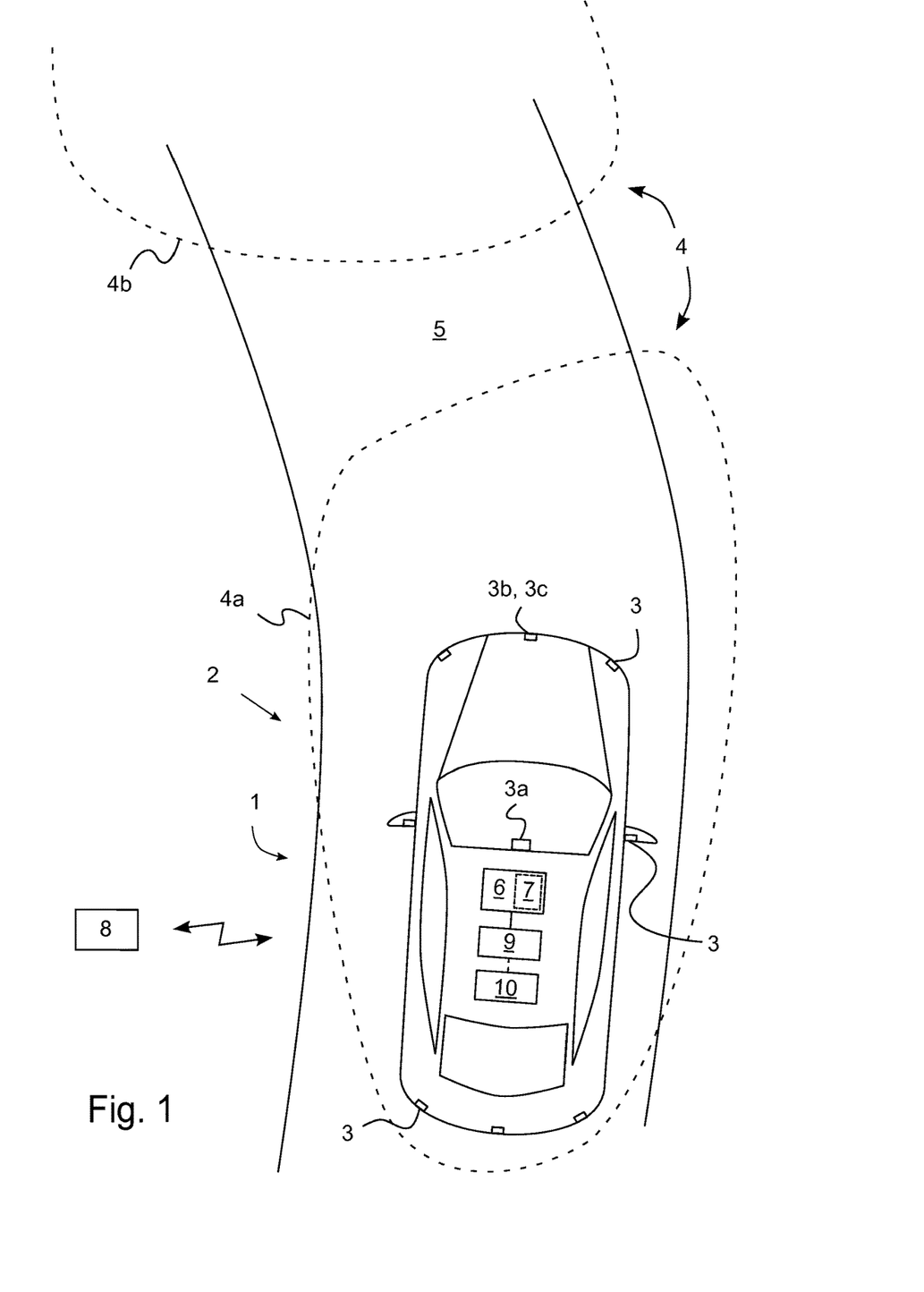
FIG. 1 illustrates a vehicle sensor diagnosis system and a vehicle comprising such a system according to some embodiments.

FIG. 1 illustrates a vehicle sensor diagnosis system 1 arranged in a host vehicle 2. The vehicle sensor diagnosis system 1 comprises one or more sensors 3 arranged to monitor a host vehicle surrounding 4, 4a, 4b during drive of the host vehicle 2 along a host vehicle route 5. The current host vehicle surrounding 4a is an area around the host vehicle 2 that the sensors, at least partly, may monitor. The host vehicle surrounding 4b illustrated in FIG. 1 is an upcoming host vehicle surrounding for an upcoming section of the route 5. The location of the host vehicle surroundings will change with the host vehicle 2 when the host vehicle 2 drives along the route 5.

The sensors 3 may be one or more camera sensors 3a, one or more radar sensors 3b and/or one or more lidar-sensors 3c. As illustrated in FIG. 1, sensors 3 may be arranged at any position in/on the host vehicle 2 from where detection of a vehicle surrounding 4 is possible. Sensors 3 may for example be arranged at a vehicle front-, side and/or rear portion, at a vehicle grille, bumpers, rear-view-mirrors and/or a windshield. Some sensors 3 may be arranged in or near a vehicle compartment, chassis, motor, drivetrain and/or wheels. The sensor position may depend on the type of sensor. For example, a camera sensor 3a may be arranged at the inside of a windshield, while one or more radar sensors 3b and/or a lidar sensor 3c may be arranged in the grille and/or bumpers.

A camera sensor 3a may be e.g. a front- or rear facing digital camera equipped with or connected to one or more processors with object recognition logics. Hereby surrounding objects, such as road lanes, other vehicles, traffic signs, pedestrians, animals, different obstacles etc. may be detected and in some cases, identified/classified. Radar sensors 3b may include transmitters that emit signals that bounce back from object around the host vehicle, and receivers that receive the returned signals. The radar sensors 3b may include e.g. ultra wide band radars, narrow band radars and/or multi node radars. Lidar-sensors 3c may measure distances to objects through illuminating the objects with a laser and analyzing the reflected light. Other types of sensors 3 used to monitor the vehicle surrounding may be e.g. ultrasonic sensors and/or infrared sensors.

The vehicle sensor diagnosis system 1 further comprises one or more processing units 6. According to some embodiments the one or more processing units 6 comprise, or are connected to, one or more memory units 7. At least one processing unit 6 is connected to at least one database 8. The connection may be wireless, e.g. when the database 8 is a remote server (also referred to as the cloud). The connection may also be wired, e.g. if at least a part of the database 8 is comprised in the host vehicle 2.

The database or databases may be arranged as one or more remote servers, also referred to as the cloud. In some embodiments at least some of the database information on host vehicle surroundings may be stored in one or more memory units in the host vehicle. The memory units in the host vehicle may be connected to the processing unit, such that the processing unit can access information on vehicle surrounding also during periods of interrupted connection between the host vehicle and the at least one database.

As mentioned, the vehicle sensor diagnosis system 1 comprises at least one processing unit 6, possibly connected to one or more memory units 7. The one or more memory units may be arranged to store sensor data. In some embodiments the one or more processing units 6 are used for processing in several different vehicle systems. Some processing units 6 may be dedicated to a specific processing task. In some embodiments the host vehicle 2 and/or the vehicle sensor diagnosis system 1 may comprise a large number of processing units 6. The one or more processing units 6 may be central processing units, CPUs, also referred to as central processor units, that carries out instructions of computer programs/software, which, when executed perform basic arithmetical, logical, and input/output operations. The vehicle sensor diagnosis system 1 may also comprise an accelerated processing unit, APU, also referred to as an advanced processing unit. An APU is a processing unit that includes additional processing capability designed to accelerate one or more types of computations outside of a CPU. One or more processing units 6 may comprise application programming interfaces, APIs, which specify how software components may interact with each other.

According to some embodiments, the host vehicle 2 comprises an autonomous drive arrangement 10. The autonomous drive arrangement 10 may comprise an electrical/mechanical control arrangement, arranged to control steering and velocity of the host vehicle 2 based on information received from the sensors 3. The control arrangement 10 is connected to a vehicle steering system, such that the control arrangement, directly or indirectly, can control a direction of at least some of the wheels of the host vehicle 2. Hereby e.g. a yaw rate of the host vehicle 2 can be adjusted, such that the driving direction of the host vehicle 2 is adjusted in accordance with the input from the control arrangement. The control arrangement is also connected to a vehicle engine and a vehicle braking system, such that the control arrangement, directly or indirectly, can control acceleration and/or deceleration of the host vehicle 1. The control arrangement can e.g. increase a vehicle velocity by increasing the engine speed, and decrease the vehicle velocity by motor-braking or by activation of one or more wheel brakes. The control arrangement may e.g. be connected to an ABS (anti-lock braking system), such that one or more wheel brakes can be activated selectively.

The vehicle sensor diagnosis system 1 is, wirelessly or by wire, connected to a host vehicle positioning arrangement 9, arranged to determine a host vehicle position and driving direction. According to some embodiments the positioning arrangement 9 is part of or connected to a vehicle navigation system. The positioning system 9 may determine the host vehicle position and driving direction e.g. via a satellite based global positioning system or via map matching and a compass.

When the host vehicle 2 drives along the host vehicle route 5, the vehicle sensor diagnosis system 1 is arranged to predict upcoming vehicle surrounding conditions in the upcoming host vehicle surrounding 4b along at least a section of the host vehicle route 5 within the upcoming host vehicle surrounding 4b. The prediction is based on database 8 information on the upcoming host vehicle surrounding 4b and on information on the current host vehicle surrounding 4a.

The vehicle sensor diagnosis system 1 is further arranged to estimate which level of sensor performance that can be expected for the upcoming route section 4b.

For example: In the current host vehicle surrounding 4a, one or more of the sensors detects that the sun shines at the host vehicle 2 from a first direction, e.g. from a left side. If the vehicle sensor diagnosis system 1 is informed that the host vehicle route ahead of the host vehicle 2 will extend in a direction to the left, i.e. towards the sun, the vehicle sensor diagnosis system 1 may expect that some vehicle sensors 3 will have a certain level of sensor performance when the host vehicle 2 drives along the upcoming section.

If the host vehicle route would have turned to the right instead, another level of sensor performance would have been expected.

In this example, the vehicle sensor diagnosis system estimates that a front-facing camera sensor 3a or a radar sensor 3b may be expected to detect oncoming vehicles or road signs at a distance of 50 meters away from the host vehicle on the upcoming route section when the above light conditions prevail.

Figure 2:
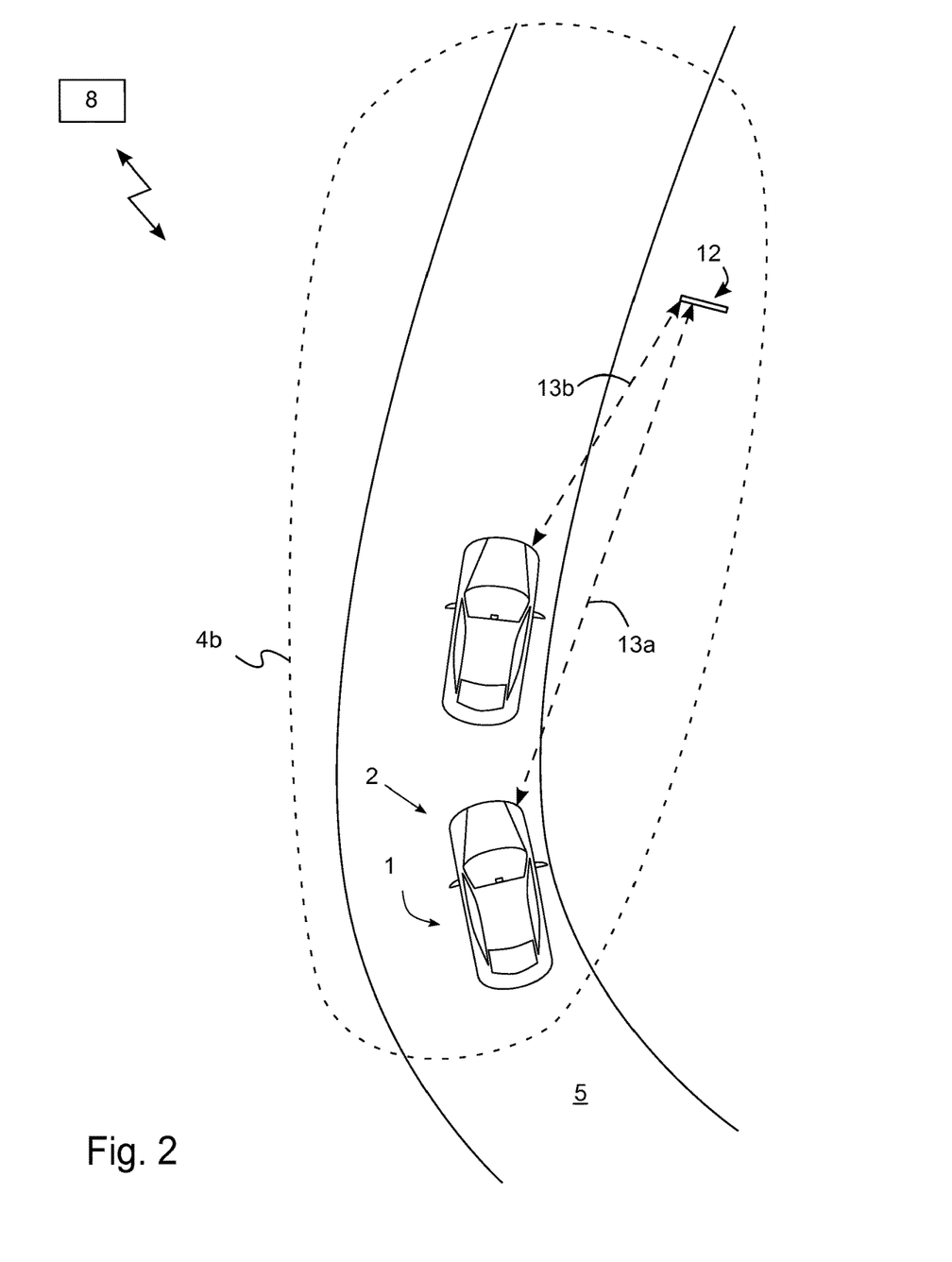
FIG. 2 illustrates a vehicle sensor diagnosis system and a vehicle comprising such a system according to some further embodiments.

In FIG. 2 the host vehicle 2 is illustrated when it has reached the (previously upcoming) section of the host vehicle route 5, i.e. the host vehicle surrounding 4b.

During drive in the host vehicle surrounding 4b, the vehicle sensor diagnosis system 1 is arranged to assess the detected level of sensor performance in the host vehicle surrounding 4b. For example, it may be assessed that the front facing camera sensor 3a detects oncoming vehicles or a road sign 12 at a distance of 45 meters from the host vehicle 2. In FIG. 2, the expected distance is indicated as distance 13a and the detected distance is indicated as distance 13b.

The vehicle sensor diagnosis system 1 is arranged to assess the difference between the estimated level of sensor performance and the detected level of sensor performance for the host vehicle route section in host vehicle surrounding 4b. The result of the assessment may be expressed e.g. as a ratio between the different levels of sensor performance (the detected level of sensor performance is 90% of the expected level), or by a detection range or availability. The level of sensor performance may be expresses in many different ways, e.g. detection probability, availability, detection range or signal to noise ratio, depending e.g. on the sensor type.

If the host vehicle 2 drives along the same host vehicle route section several times, the level of sensor performance may also be assessed through the frequency with which a sensor 3 detects a certain object, such as a road sign. The camera sensor 3a may be expected to detect the road sign every time the host vehicle 2 passes the road sign. When the camera sensor 3a is new, this may be the case. If, after a few years, the same camera sensor 3a only detects the road sign 90% of the times, the difference between the expected and detected level may be assessed to be 10%.

If the difference exceeds a first threshold difference, the vehicle sensor diagnosis system is arranged to initiate a diagnose result communication. The diagnose result may e.g. be displayed on a vehicle display and/or may be uploaded to the database 8. Hence, the driver may be informed of the degradation of the one or more sensors 3, and a vehicle workshop, with access to the database 8, may be prepared to clean or repair the sensor 3 at next service.

During night, the sensors 3 may be expected to detect the road sign 12 e.g. 40 meters from the road sign. If the sensors 3 detect the road sign 3 at 35 meter, the difference is 5 meters. The threshold difference may differ depending on the vehicle surrounding conditions. For example, during night-time a difference of 10% is selected, while a difference of 15% is selected during daytime. Different threshold differences may be selected for different sensors 3.

According to some embodiments, the vehicle sensor diagnosis system 1 is arranged to retrieve information on sensor performance levels for sensors in other vehicles from the database 8. The vehicle sensor diagnosis system 1 may further be arranged to estimate the expected level of sensor performance for at least an upcoming section of said host vehicle route also based on the information on sensor performance levels for sensors in other vehicles.

Hence, the vehicle sensor diagnosis system 1 may assess if any problems with detecting objects are related to sensors 3 in a particular vehicle or with objects along a particular road section. Performance levels between different sensors 3 and between sensors 3 in different vehicle models may be compared and assessed.

Sensor performance levels for sensors 3 in several vehicles, such as in an entire vehicle fleet, may be collected and assessed. Statistics on sensor performance levels for different sensors 3 in different vehicle models may be used for the estimation of sensor performance levels. Since the detected sensor performance level and any estimated sensor performance level may be uploaded and saved to the database 8, information on sensor performance levels for any vehicle sensor 3 may be collected. This information may be used to calculate and/or predict sensor performance levels for any type of sensor 3 along the lifetime of the sensor and/or the vehicle. Statistics over performance levels for different sensors 3, collected from a plurality of vehicles, may be used in the assessment of sensor performance levels.

According to some embodiments the vehicle sensor diagnosis system 1 is arranged to repeatedly assess and store information on the difference between the estimated level of sensor performance and the detected level of sensor performance over an extensive time period, such as over a sensor lifetime. The vehicle sensor diagnosis system 1 may then be arranged to initiate a diagnose result communication if the difference exceeds a second threshold difference.

If the second threshold difference is selected to be slightly less than the first threshold difference, the vehicle sensor diagnosis system 1 may communicate that the sensor degradation is expected to soon reach the first threshold difference. The sensor 3 may then be cleaned or repaired before it becomes too degraded.

According to some embodiments, the vehicle sensor diagnosis system 1 is arranged in an autonomous host vehicle. The vehicle sensor diagnosis system 1 may then be arranged to disable autonomous drive functions if the difference between the estimated level of sensor performance and the detected level of sensor performance for said host vehicle route section exceeds the first threshold difference.

According to some embodiments the vehicle sensor diagnosis system 1 is arranged to categorize driving route sections within a road network, based on the assessment of sensor performance. During autonomous driving, some driving routes sections may be considered to be more suitable to drive than other routes. Routes for which sensor performance are expected to function better, or for which host vehicle surrounding conditions are expected to be better may then be selected as preferred host vehicle routes 5.

The vehicle sensor diagnosis system 1 initiates a diagnose result communication if the difference between estimated and detected levels of sensor performance for a host vehicle route section exceeds a first threshold difference. The sensor performance may relate e.g. to detection of a road sign, detection of road geometry along a host vehicle route section, detection of light and/or weather conditions and detection of received data signal strength for the positioning arrangement 9.

Figure 3:
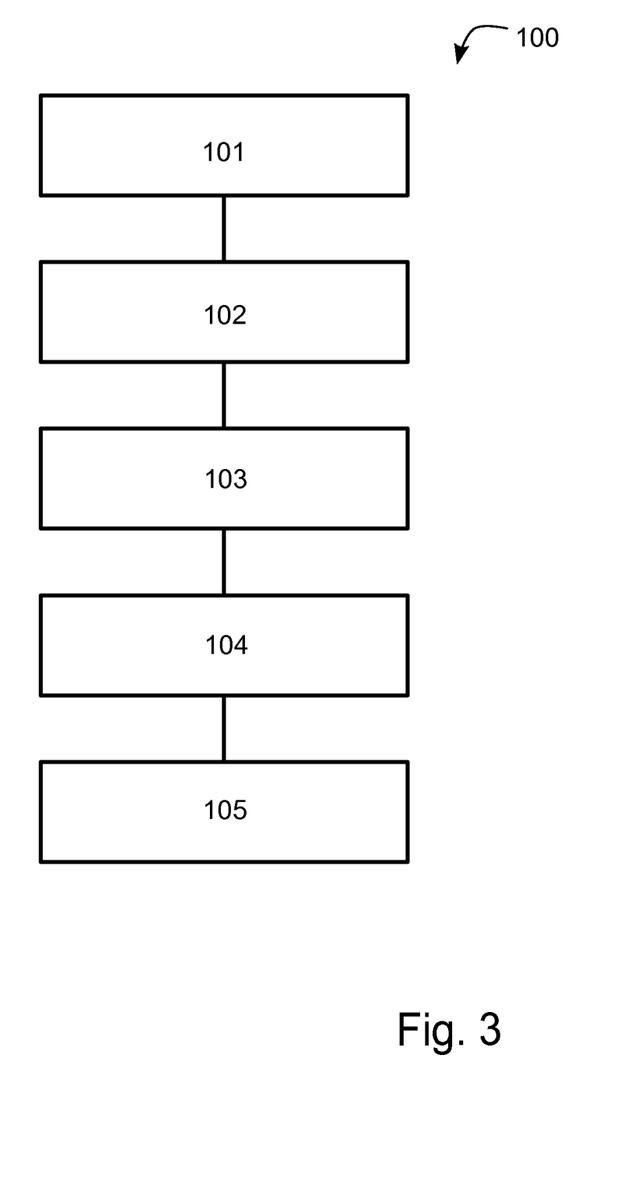
FIG. 3 illustrates a method for diagnosing vehicle sensors.

FIG. 3 illustrates a method 100 for diagnosing vehicle sensors with a vehicle sensor diagnosis system 1. The vehicle sensor diagnosis system comprises one or more sensors 3 arranged to monitor a host vehicle surrounding during drive along a host vehicle route 5 and one or more processing units 6 connected to a database 8. The vehicle sensor diagnosis system 1 is connected to a host vehicle positioning arrangement 9, which is arranged to determine a host vehicle position and driving direction. The method comprises:

Predicting 101, by the processing unit 6, upcoming vehicle surrounding conditions along at least a section of the host vehicle route based on, from the database 8 retrieved, information on the host vehicle surroundings along said section and information on a current host vehicle surrounding.

Estimating 102, by the processing unit 6, an expected level of sensor performance for said route section based on the prediction.

Assessing 103, by the processing unit 6, the level of sensor performance detected during host vehicle travel along said host vehicle route section.

Assessing 104, by the processing unit 6, if a difference between the estimated level of sensor performance and the detected level of sensor performance for said host vehicle route section exceeds a first threshold difference and if so, initiating 105, by the processing unit 6, a diagnose result communication.

Although aspects have been described with reference to example embodiments, many different alterations, modifications and the like will become apparent for those skilled in the art. While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments.

What is claimed is:

1. A vehicle sensor diagnosis system comprising:
   a sensor configured to monitor a current surrounding of a host vehicle during driving along a host vehicle route; and
   a processing unit connectable to a database;
   the vehicle sensor diagnosis system being connectable to a host vehicle positioning arrangement configured to determine a host vehicle position and driving direction, wherein the vehicle sensor diagnosis system is configured to:
   predict, by the processing unit, upcoming conditions along an upcoming section of the host vehicle route based on information retrieved from the database on surroundings along the upcoming section and on the current surrounding of the host vehicle;
   estimate, by the processing unit, a level of performance to be expected of the sensor for the upcoming section of the host vehicle route based on the predicted upcoming conditions along the upcoming section;
   assess, by the processing unit, a level of performance of the sensor detected during host vehicle travel along the upcoming section;
   assess, by the processing unit, when a difference between the estimated level of sensor performance and the detected level of sensor performance exceeds a first threshold difference;
   when the difference between the estimated level of sensor performance and the detected level of sensor performance exceeds the first threshold difference, initiate, by the processing unit, a diagnosis result communication based on the assessed difference between the estimated and detected levels of sensor performance; and
   retrieve from the database information on sensor performance levels for sensors in other vehicles.

2. The vehicle sensor diagnosis system according to claim 1 wherein the vehicle sensor diagnosis system is configured to communicate the diagnosis result into a vehicle interior.

3. The vehicle sensor diagnosis system according to claim 1 wherein the vehicle sensor diagnosis system is configured to communicate and store the diagnosis result to the database.

4. The vehicle sensor diagnosis system according to claim 1 wherein the vehicle sensor diagnosis system is further configured to estimate the expected level of sensor performance for the section of the host vehicle route also based on the information on sensor performance levels for sensors in other vehicles.

5. The vehicle sensor diagnosis system according to claim 1 wherein the vehicle sensor diagnosis system is arranged in an autonomous vehicle.

6. The vehicle sensor diagnosis system according to claim 5 wherein the sensor diagnosis system is further configured to disable autonomous drive functions if the difference between the estimated level of sensor performance and the detected level of sensor performance for the section exceeds the first threshold difference.

7. The vehicle sensor diagnosis system according to claim 1 wherein the vehicle sensor diagnosis system is further configured to estimate an expected level of sensor performance for the section of the host vehicle route based on information, retrieved from the database, wherein the information comprises at least one of road sign information, road geometry information, light condition information, weather information, and information on received data signal strength for the positioning arrangement.

8. The vehicle sensor diagnosis system according to claim 1 wherein the vehicle sensor diagnosis system is further configured to:
   repeatedly assess and store information on the difference between the estimated level of sensor performance and the detected level of sensor performance over a period of time; and
   initiate a diagnosis result communication if the difference exceeds a second threshold difference.

9. A vehicle comprising a vehicle sensor diagnosis system according to claim 1.

10. A method for diagnosing vehicle sensors with a vehicle sensor diagnosis system comprising a sensor configured to monitor a current surrounding of a host vehicle during driving along a host vehicle route and a processing unit connectable to a database, the vehicle sensor diagnosis system being connectable to a host vehicle positioning arrangement configured to determine a host vehicle position and driving direction, the method comprising:
   predicting, by the processing unit, upcoming conditions along an upcoming section of the host vehicle route based on information retrieved from the database on surroundings along the upcoming section and on the current surrounding of the host vehicle;
   estimating, by the processing unit, a level of performance to be expected of the sensor for the upcoming section of the host vehicle route based on the predicted upcoming conditions along the upcoming section;

assessing, by the processing unit, a level of performance of the sensor detected during host vehicle travel along the upcoming section;

assessing, by the processing unit, when a difference between the estimated level of sensor performance and the detected level of sensor performance exceeds a first threshold difference;

when the difference between the estimated level of sensor performance and the detected level of sensor performance exceeds the first threshold difference, initiating, by the processing unit, a diagnosis result communication based on the assessed difference between the estimated and detected levels of sensor performance; and retrieving from the database information on sensor performance levels for sensors in other vehicles.

11. The method of claim 10 further comprising communicating the diagnosis result into a vehicle interior.

12. The method of claim 10 further comprising communicating and storing the diagnosis result to the database.

13. The method of claim 10 further comprising estimating the expected level of sensor performance for the section of the host vehicle route also based on the information on sensor performance levels for sensors in other vehicles.

14. The method of claim 10 wherein the vehicle sensor diagnosis system is arranged in an autonomous vehicle.

15. The method of claim 14 further comprising disabling autonomous drive functions if the difference between the estimated level of sensor performance and the detected level of sensor performance for the section exceeds the first threshold difference.

16. The method of claim 10 wherein the information retrieved from the database for use in estimating an expected level of sensor performance comprises at least one of road sign information, road geometry information, light condition information, weather information, and information on received data signal strength for the positioning arrangement.

17. The method of claim 10 further comprising:

repeatedly assessing and storing information on the difference between the estimated level of sensor performance and the detected level of sensor performance over a period of time; and initiating a diagnosis result communication if the difference exceeds a second threshold difference.

* * * * *